Figure 1:
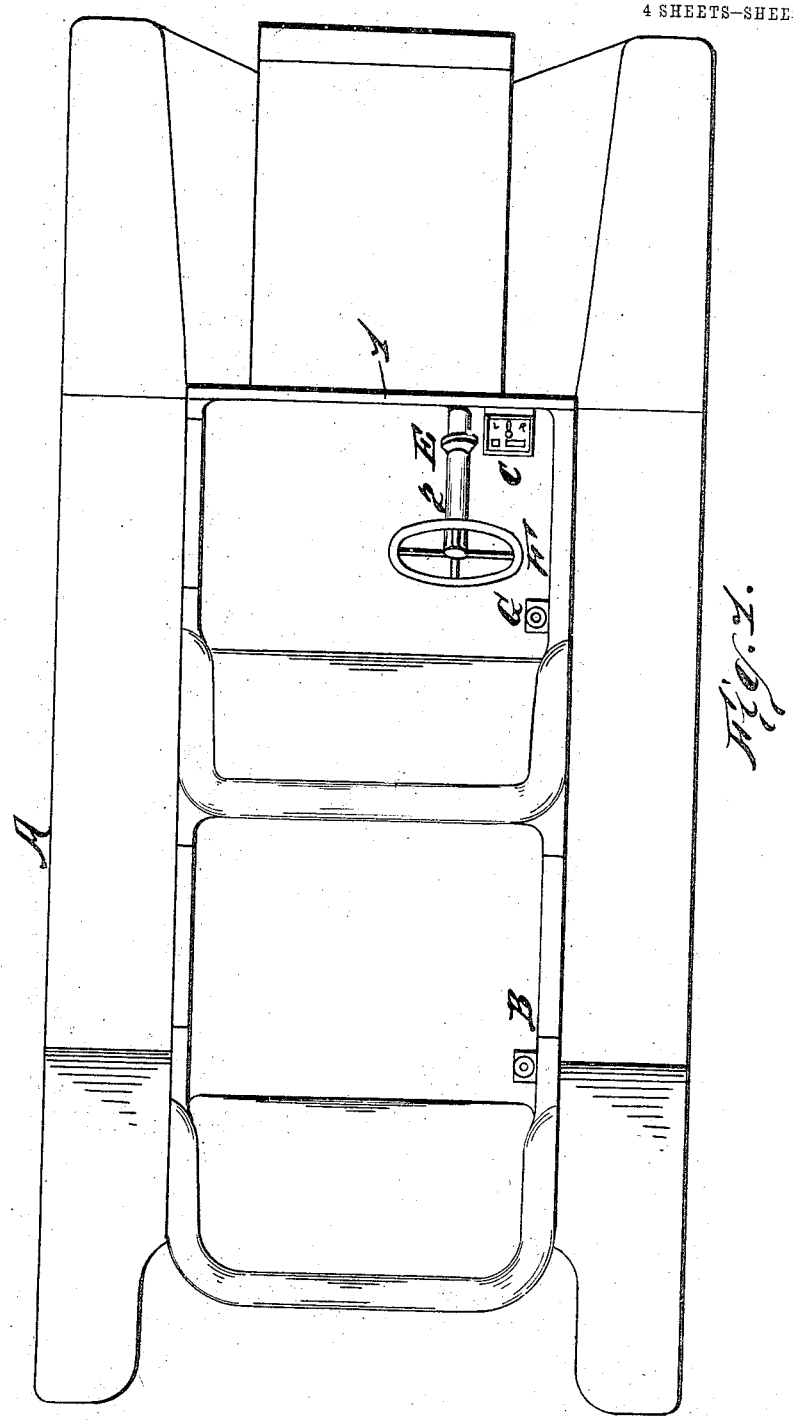

H. KRAMER.
INDICATING DEVICE FOR MOTOR VEHICLES.
APPLICATION FILED APR. 23, 1914.

1,124,463.

Patented Jan. 12, 1915.

4 SHEETS—SHEET 1.

H. KRAMER.
INDICATING DEVICE FOR MOTOR VEHICLES.
APPLICATION FILED APR. 23, 1914.
1,124,463.
Patented Jan. 12, 1915.
4 SHEETS—SHEET 2.
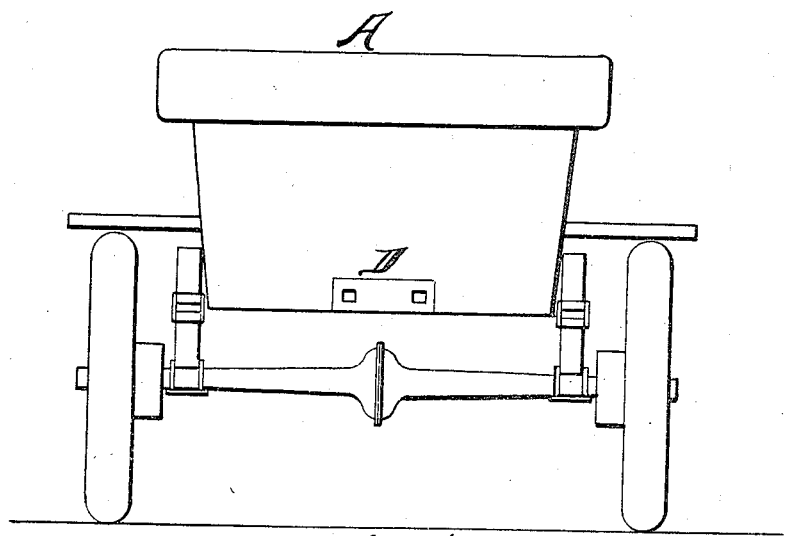
Fig. 2.
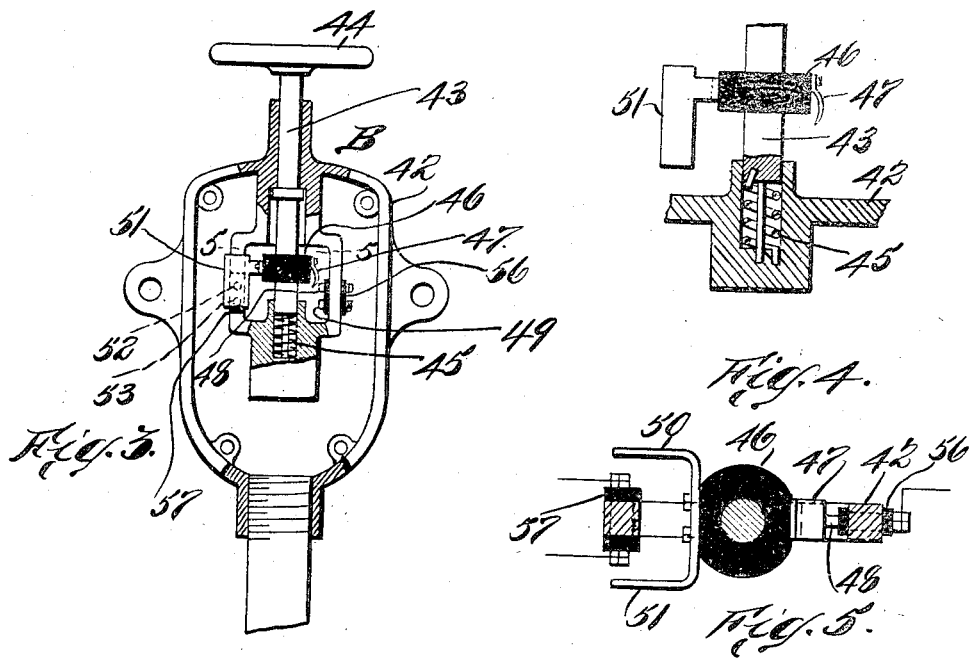
Witnesses
E. A. Jarvis
Mrs. Shorle
Inventor
Herman Kramer
G. Maurice Bloch
attorney.

H. KRAMER.
INDICATING DEVICE FOR MOTOR VEHICLES.
APPLICATION FILED APR. 23, 1914.
1,124,463.
Patented Jan. 12, 1915.
4 SHEETS—SHEET 3.
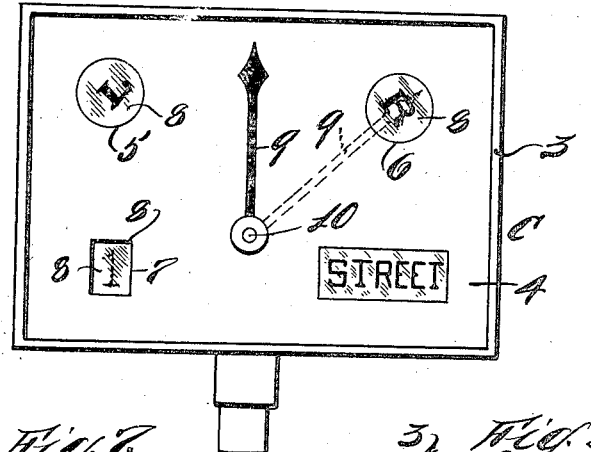
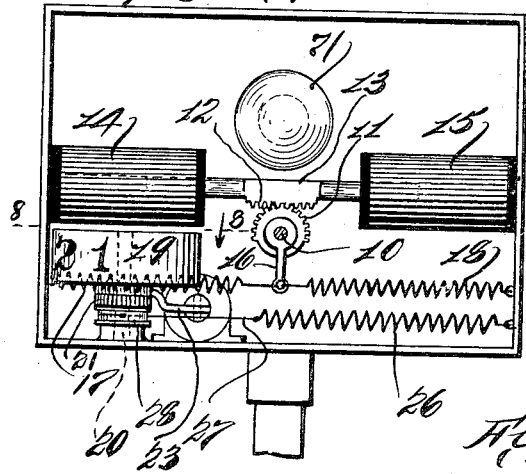
Witnesses
Inventor
Herman Kramer
attorney

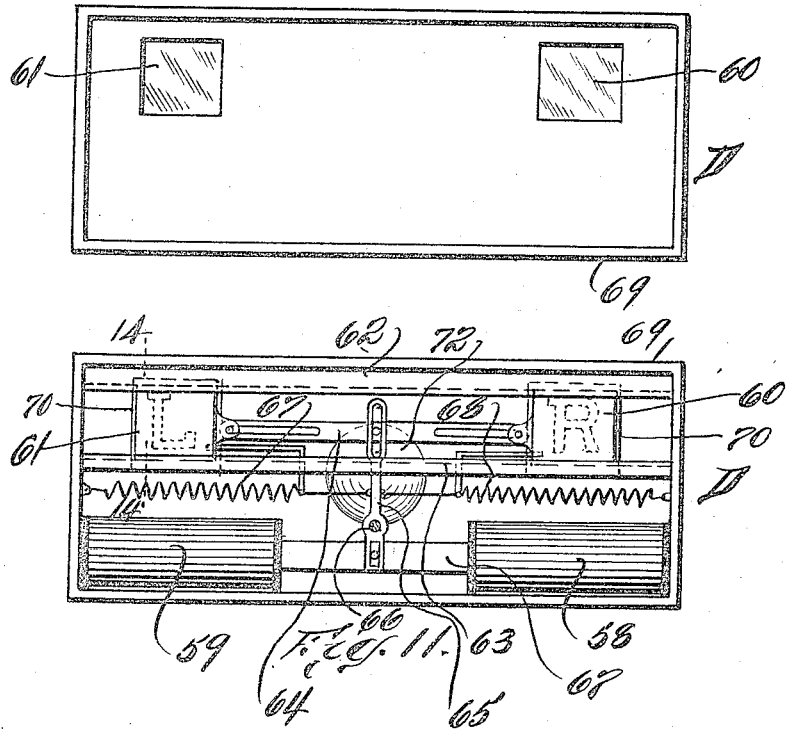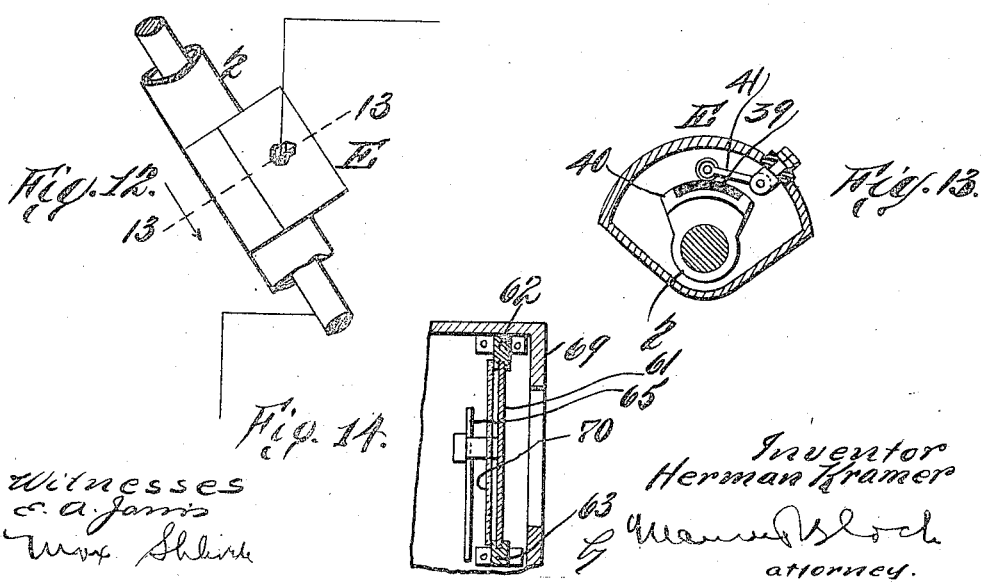

UNITED STATES PATENT OFFICE.

HERMAN KRAMER, OF NEW YORK, N. Y.

INDICATING DEVICE FOR MOTOR-VEHICLES.

1,124,463.

Specification of Letters Patent. Patented Jan. 12, 1915.

Application filed April 23, 1914. Serial No. 833,870.

*To all whom it may concern:*

Be it known that I, HERMAN KRAMER, a citizen of the United States of America, residing at New York city, Bronx county, State of New York, have invented certain new and useful Improvements in Indicating Devices for Motor-Vehicles, of which the following is a full, clear, and exact description.

This invention relates to an indicating device for motor-vehicles, the particular object being to provide a mechanism whereby the occupant of a motor-vehicle, particularly of the limousine or closed type, can notify the chauffeur when he (the occupant) wishes to turn into a street to the right or left, that is to say, to notify the chauffeur that he wishes to turn into the first, second, third or other street ahead; the device is also arranged to set a right or left turn signal at the rear of the vehicle simultaneously with notifying the chauffeur.

By means of my improved signaling device the occupant of a closed motor-vehicle can notify the chauffeur if he desires to turn into a street ahead without the necessity of leaning out of a door or window.

My improved device has advantages over the telephone systems used in closed vehicles, for the reason that while the occupant of the rear of the vehicle is conversing with the chauffeur, the attention of the chauffeur is for the moment distracted.

My improved signaling device is a mute transmitter of the desire of the passenger.

My improved signaling device may be used on touring cars, as well as on closed cars.

I will now proceed to describe my invention in detail, the novel features of which I will point out in the appended claims, reference being had to the accompanying drawings, forming part hereof, wherein—

Figure 1 is a top plan view of a touring car having my improved signaling device applied thereto; Fig. 2 is a rear view of a car showing the tail signal casing; Fig. 3 is a face view, partly in section, of the passenger's switch, the cover of the casing being removed; Fig. 4 is an enlarged sectional view of a portion of said switch; Fig. 5 is an enlarged sectional plan view of a portion of the switch, the section being taken on a line 5—5 in Fig. 3; Fig. 6 is an outside face view of the chauffeur's indicator; Fig. 7 is a front view thereof, the cover being removed; Fig. 8 is an enlarged fragmentary sectional plan view thereof, the section being taken on a line 8—8 in Fig. 7; Fig. 9 is a diagrammatic view of the wiring; Fig. 10 is an outside face view of the tail signal casing; Fig. 11 is a front view thereof, the cover being removed; Fig. 12 is a fragmentary side view of the steering post and restoring switch casing; Fig. 13 is a sectional view thereof, the section being taken on a line 13—13 in Fig. 12, and Fig. 14 is an enlarged cross sectional view, the section being taken on a line 14—14 in Fig. 11.

As before stated the device herein illustrated is for the purpose of enabling the passenger, in the rear of a motor-vehicle, to notify the chauffeur when he wishes to turn to the right or left into a street ahead, at the same time setting a similar signal at the rear of the vehicle, indicating to persons behind in which direction the vehicle is turning or is about to turn. To carry out my invention I place in the tonneau of a vehicle, indicated by A, a switch mechanism B, which is electrically connected to an indicating device C located (for instance) on the dash-board 1 of the vehicle A, in such a position that the chauffeur will see it. In connection with the above mentioned switch and indicator I place an indicator or signal device D at the rear of the vehicle A (see Fig. 2), the said device D being in circuit with the switch B and indicator C. Upon the steering post 2, I place a restoring switch, generally indicated by E. By means of the switch B a passenger in the rear of the car can set a signal in the indicating device C which will notify the chauffeur that he, the passenger, wishes to turn to the right or left into a street ahead. A right or left signal will also be set, simultaneously with the setting of the indicator signal, in the signal-box at the rear of the vehicle.

The chauffeur's signal C consists of a suitable casing 3 (Figs. 6, 7 and 8) having a front cover 4 provided with openings 5, 6 and 7, preferably closed by a glass plate 8. At one side of the cover, I place the legend "Street," the said legend being in line with the opening 7 at which the numeral which indicates the street to be turned into, will appear. Upon the plates 8, in the openings 5 and 6, I print, paste, stamp, or otherwise apply, the letters "L" and "R" indicating right and left, the said letters being applied at their corresponding sides of the casing.

In connection with the above right or left indications, I employ a pointer 9 carried by a pivotal shaft 10, the said shaft being provided with a gear 11 meshing with a rack 12 on the core 13 for the solenoids or magnets 14 and 15 (Fig. 7). The shaft 10 is also provided with an arm 16, to which is connected one end of a pair of springs 17 and 18. The springs 17 and 18 act to restore the pointer to the neutral position after the circuit for the magnets 14 and 15 has been broken.

The street indications are applied to the peripheral surface of a drum 19 carried by a rotatable shaft 20, which also carries a ratchet 21 having in engagement therewith a pawl 22 carried by the bell-crank lever 23 pivotally supported by the shaft 20. The lever 23 is actuated by a solenoid or magnet 24 and its slidable core 25. To restore the drum to normal position after it has been rotated by the magnet 24 and connections, I employ a spring 26 which is connected to a cable 27 passing around a spool 28 on the shaft 20. To hold the drum against the tension of the spring 26, while the pawl 22 is being retracted by the spring 29, I employ a retaining pawl 30 pivoted as at 31 to the casing 3. A spring 32 keeps the pawl 30 in engagement with the ratchet 21.

As can be seen in Fig. 8, the pawls 22 and 30 are connected for simultaneous release, but the said connection does not interfere with the reciprocations of the pawl 22. To accomplish this result, I provide the pawl 30 with a curved slot 33 in which a pin 34 carried by the pawl 22 will reciprocate; hence the pawl 22 is free to come and go. To release the pawls 22 and 30 I employ a magnet 35 which acts upon the pawl 30 to draw it and the pawl 22 away from the ratchet 21. The magnet 35 is operated by a circuit which is independent of the circuits for the magnets for the signals. The circuit for the magnet 35 is indicated by the wires 36 and 37, Fig. 9, the source of power, indicated by 38, being common to all of the magnets. To control the circuit for the release magnet 35 I employ the cut-out switch mechanism E which is mounted on the steering-post of the vehicle or in any way operable by the steering post. The magnet 35 is normally out of circuit, it being placed in circuit only when the wheel F (Fig. 1) is turned sufficiently to turn a corner. The insulation 39, on the switch segment 40, will be extensive enough to permit the vehicle to be turned to the right or left, to meet ordinary road requirements, without closing the circuit for the magnet 35, but when the wheel F is turned sufficiently to cause the vehicle to turn a corner, to the right or left, the contact arm 41 (Fig. 13) will contact with the segment 40. The magnet 35 will then become excited and release the pawls 22 and 30. If the street indicator 19 is set at the time the vehicle makes the turn, the spring 26 will restore the drum to normal as soon as the pawls 22 and 30 are released. By this means the street indicator will be automatically restored as soon as the vehicle is straightened, in its course after having turned a corner.

To actuate the street indicator 19 and pointer 9, as well as the tail signal, is the function of the switch B.

The switch B consists of a casing 42 carrying a rotatable rod 43 which is also depressible or longitudinally movable, a handle 44 being provided to manipulate the rod 43. The rod 43 acts against the tension of a spring 45 both when turned, or rotated, or when depressed.

Upon the rod 43 I place a block 46 of insulating material which carries a circuit-closer 47, for the contacts 48 and 49, and a pair of circuit-closers 50 and 51 for the contacts 52, 53, 54 and 55. The contacts 48 and 49 are carried by a block 56 of insulating material carried by the casing 42, while the contacts 52, 53, 54 and 55 are carried by a block 57 of insulating material, also carried by the casing 42.

As will be seen in Fig. 9, the contacts 48 and 49 are in circuit with the street indicating-magnet 24; hence when the rod 43 is depressed the circuit closer 47 will bridge the said contact and complete the circuit for said magnet. As will also be seen, the contacts 52 and 53 are in circuit with the magnet 15 for the pointer 9 and magnet 58 of the tail signal, the contacts 54 and 55 are in circuit with the magnet 14 for the pointer 9 and magnet 59 of the tail signal. When the rod 43 is turned to the right, the circuit closer 51 (Fig. 4) will bridge the contacts 52 and 53, thereby completing the circuit for the magnets 15 and 58. When the rod 43 is turned to the left the circuit closer 50 will bridge the contacts 54 and 55, thereby closing the circuit for the magnets 14 and 59. When the contacts 52 and 53 are bridged the pointer 9 will move to the right pointing to the letter R, and at the same time the screen 60 of the tail signal will move to the left, uncovering the letter R at the rear of the vehicle. When the rod 43 is turned to the left the magnets 14 and 59 will be energized moving the pointer to the letter L and uncovering the letter L at the rear of the vehicle. It will therefore be seen that the manipulator of the switch B can set the signal at the rear of the vehicle and also notify the driver. The rear signal consists of the slidable screens 60 and 61 movably mounted in guides 62 and 63. The screens are connected by a link 64 actuated by a lever 65 pivotally mounted as at 66. The lever 65 is oscillated to the right or left by the magnets 58 and 59, the said screens and lever being returned to the normal position after the circuit has been broken, by springs 67 and 68.

The letters L and R in the casing 69 of the rear signal are carried by glass plates 70 (Fig. 14) behind the screens 60 and 61 by which the plates are normally covered. In the casing 3 of the driver's signal and casing 69 of the rear signal I place electric lamps 71 and 72, respectively, which are in circuit with the lights of the vehicle. When the vehicle lights are turned on the lamps 71 and 72 will light, casting rays through the windows in the casings. Therefore at night the signals can be seen. If the passenger wishes to turn to the right into the first street ahead, he would depress the rod 43 once, thereby causing the numeral 1 to appear at the window 7, and then turn the said rod to the right, causing the pointer 9, in a manner described, to point to the letter R. For the second, or third street ahead, the rod 43 would be depressed two or three times and then turned right or left as the case may be. As soon as the rod is turned to normal the R or L sign will disappear at the rear, and the pointer will move to normal, but the street indication will remain until the vehicle has turned into the street and straightened in its course as has been described.

In order that the driver can operate the rear signal when alone in the vehicle or independently of a passenger, a switch G may be placed adjacent the driver as shown in Fig. 1 and which is also shown connected with the rear signal circuit shown in Fig. 9. The switch G is identical with the passenger switch B.

Having now described my invention what I claim as new and desire to secure by Letters Patent is:

1. A signal for motor-vehicles consisting of a street indicating device, means operable by a passenger of the vehicle adapted to set the signal for the street to be turned into, and means operable by the turning movement of the steering gear to automatically restore the signal.

2. In a signal system for motor-vehicles, a plurality of magnets, street and direction indicators operable by said magnets, a circuit for said magnets, a switch operable by a passenger of the vehicle adapted to close the circuit for said magnets, means to hold the street indicator in set position, and means operable by the turning movement of the steering gear to automatically release the street indicator-holding means.

3. A signal system for motor-vehicles consisting of an indicator comprising a casing having applied thereto right and left indications, a pivoted pointer, electrical means to move said pointer to the right or left, a street indicating device on said casing, electrical means to operate same, a circuit for said pointer and street indicator, a switch adapted to close the circuit for said pointer and street indicator, said switch being adapted to first close the circuit for the street indicator and then the pointer, and means operable by the turning movement of the steering gear of the vehicle to restore the street indicator to normal.

4. A signal for motor-vehicles consisting of a casing, an electrically controlled pointer carried thereby to indicate a right or left turn, an electrically operated street indicator also carried by said casing, and a switch common to both said pointer and street indicator adapted to first set the street indicator and subsequently the pointer.

5. A signal device for motor vehicles consisting of a street indicating device, electrically operable means to actuate same, a switch to set said street indicating device, an electrically operable device adapted to restore said indicating device to normal, a circuit for the same, and a switch carried by the steering gear of the vehicle in circuit with the circuit for the restoring device adapted to close said circuit during the turning movement of the steering gear.

6. In a motor vehicle, a steering post, a circuit closer carried thereby, consisting of a conducting material having a portion of its surface insulated, a contact normally resting on said insulated portion, a signal carried by the vehicle, means to set the signal, electrical means to restore the signal, and a circuit, including the circuit closer on the steering post and the restoring means, adapted to restore said signal at a predetermined point during the turning movement of the steering post.

Signed at New York city, N. Y., this 21 day of April, 1914.

HERMAN KRAMER.

Witnesses:
  Edward A. Jarvis,
  Maurice Block.